Aug. 11, 1931.    P. A. CARTERET    1,818,040
SPRING
Filed Oct. 27, 1927    2 Sheets-Sheet 1

INVENTOR
PAUL ADOLPHE CARTERET
By
ATTORNEY

Aug. 11, 1931.     P. A. CARTERET     1,818,040
SPRING
Filed Oct. 27, 1927     2 Sheets-Sheet 2

INVENTOR
PAUL ADOLPHE CARTERET
By
PBWaters
ATTORNEY

Patented Aug. 11, 1931

1,818,040

UNITED STATES PATENT OFFICE

PAUL ADOLPHE CARTERET, OF NEUILLY-SUR-SEINE, FRANCE

SPRING

Application filed October 27, 1927, Serial No. 229,077, and in France October 28, 1926.

The present invention relates to leaf springs which serve in particular for the suspension of vehicles and mainly consists in a system of spring so arranged that its oscillations are automatically braked; moreover, owing to its constitution, a greater security is obtained in case of rupture of the main leaf.

This spring is essentially constituted by a leaf folded several times upon itself, or by a series of superposed leaves in which the end of each leaf is integral with the following one, the connection being effected in any manner by rollers, rivets, fasteners, keys, etc.

Preferably, this spring is formed by a leaf folded upon itself at its ends, or by a leaf at the ends of which are attached, in any way whatever, other leaves which, by crossing each other, cover it on the greater portion of its length on a single face or on both faces of the main leaf. The leaves thus arranged being firmly clamped against each other, the friction stress resulting from their relative displacements brakes the oscillations of the spring when the latter yields.

Figure 1:
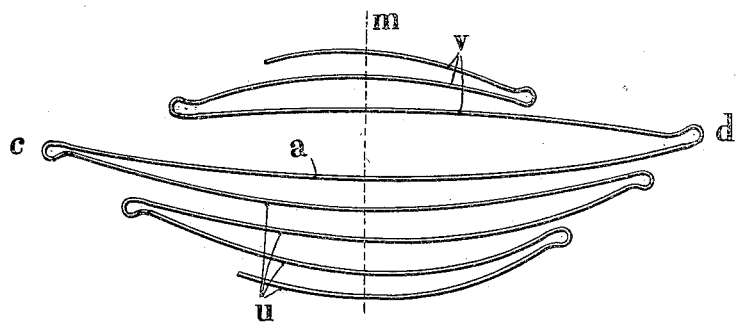
Figs. 1 to 5 show diagrammatically 5 embodiments of the spring according to the invention.
Figure 2:
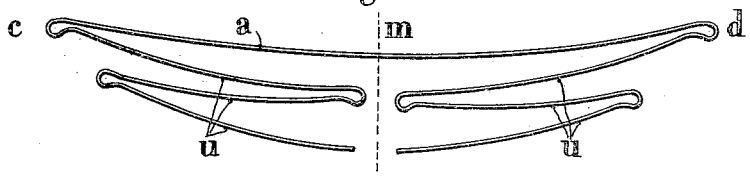
Figure 3:
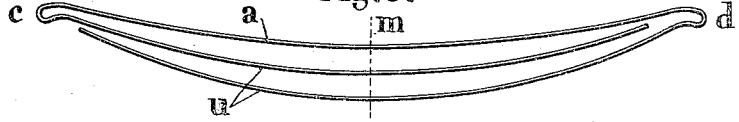

Figs. 1 to 3 of the accompanying diagrammatic drawings show various springs of this system formed by a main leaf $a$ folded several times upon itself for forming the adjacent leaves $u$ and $v$.

Figure 4:

In Fig. 4, the adjacent leaves are connected to the main leaf $a$ by rollers $r$ and are each folded on either side of this leaf throughout its length in order to have the largest possible friction surface.

Figure 5:
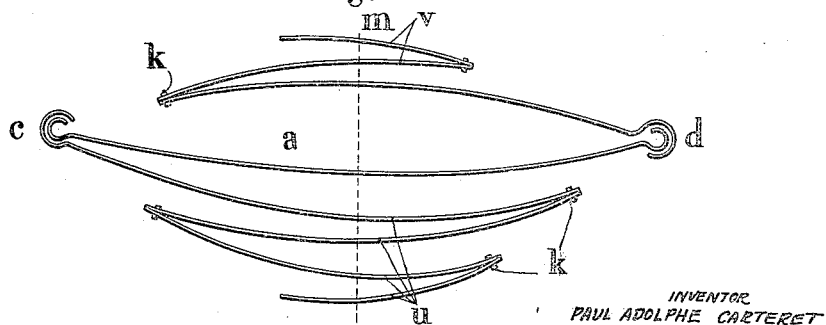

In Fig. 5, the adjacent leaves are connected together by mechanical means, such as rivets $k$, or fasteners, keys, etc.

In the drawings the elements have been detached from each other for clearly showing the constitution of the spring, but they are, in fact, firmly clamped against each other in the usual manner by a bolt; the hole provided in the adjacent leaves for the passage of the said bolt has been lengthened for permitting the slipping of these leaves upon flexure of the spring.

In fact, when the spring yields, the ends $c$ and $d$ of the main leaf $a$ draw along the leaves $u$ and $v$, and the relative sliding movement of the leaves throughout their length determines a friction stress which energetically brakes the oscillations of the spring.

On the other hand, the main leaf being reinforced by the other leaves, its rupture does not prevent the spring from remaining attached to the vehicle by the adjacent leaves and the security is thus ensured.

For obtaining a progressive braking taking place if desired, in a single direction of oscillation, the adjacent leaves are given the shape of a long wedge.

The devices forming the subject-matter of the invention are applicable to all kinds of springs: cantilever springs, half-springs, etc.

Figure 6:
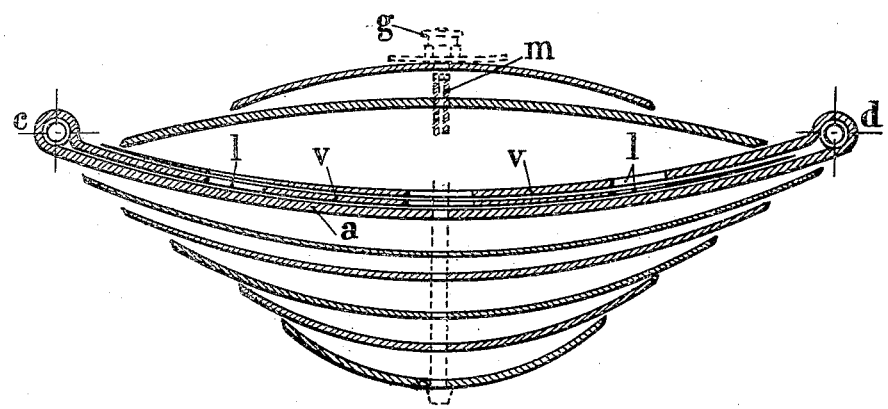
Fig. 6 is a longitudinal section of a sixth embodiment.

Fig. 6 illustrates in vertical section, by way of example, a spring in which the wedge-shaped leaves $v$ are folded throughout the length of the spring and clamped by a bolt $m$, between ordinary leaves and counter leaves which complete the spring. If the spring yields the wedge-shaped leaves tend to release themselves, whilst upon return, these leaves become wedged and progressively brake the spring.

Figure 7:
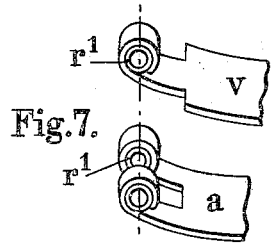
Figs. 7 and 8 are detail views showing different connections between the main leaf and the adjacent counterleafs.
Figure 8:
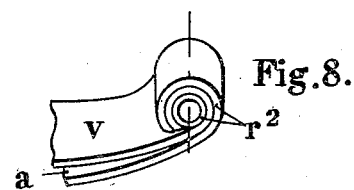

The following figures are modifications of the mode of connection of the main leaf with the adjacent leaves. either by embedded rollers $r^1$ (Fig. 7) or by superposed rollers $r^2$ (Fig. 8).

Figure 9:
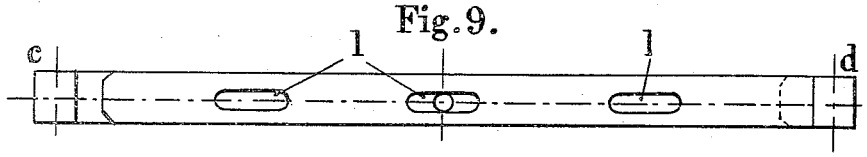
Figs. 9 and 10 are a plane and a longitudinal section of a last embodiment.

Fig. 9 is a plan view of the main leaf showing its apertures $l$ cut out in the adjacent leaves for permitting their sliding movement and serving at the same time to retain the lubricant which can be introduced through the lubricating plug $g$.

Figure 10:
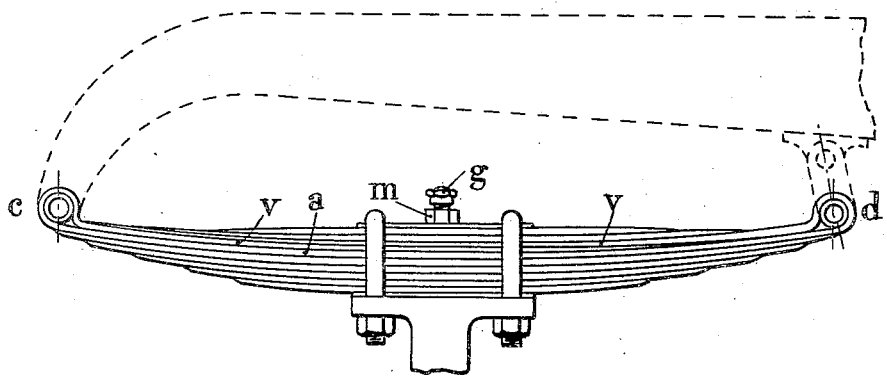

Fig. 10 shows the same spring mounted on the chassis of a motor car.

For avoiding the complete locking of the leaves, it is possible to introduce between them and the clamping nut resilient washers, springs, etc. or a plastic material, such as fabric, rubber, etc.

The above arrangements are given by way of example only; the forms, dimensions, materials used and all detail arrangements can be varied without departing thereby from the principle of the invention.

Claims:—

1. A spring comprising leaves occupying the whole length of said spring, a holding bolt fixed to said leaves, other leaves connected with the ends of said first-mentioned leaves and means permitting said other leaves to move with respect to said holding bolt.

2. A spring comprising leaves occupying the whole length of the spring, a holding bolt with reference to which said leaves are fixed, other leaves connected with the ends of the first-mentioned leaves and provided with openings to permit said other leaves to move with respect to said holding bolt.

3. A spring comprising leaves occupying the whole length of the spring, a holding bolt with reference to which said leaves are fixed, other leaves connected with the ends of said first-mentioned leaves provided with openings to permit said other leaves to move with respect to the said holding bolt, said other leaves being wedge-shaped to prevent any of the leaves from being immovable with respect to each other.

The foregoing specification of my "spring" signed by me this 7th day of October, 1927.

PAUL ADOLPHE CARTERET.